US006968432B2

(12) United States Patent
Croisettier et al.

(10) Patent No.: US 6,968,432 B2
(45) Date of Patent: Nov. 22, 2005

(54) METHOD AND SYSTEM FOR ALTERING A SEQUENCE NUMBER ASSIGNMENT PATTERN WHILE PRESERVING INTEGRITY AND HIGH CONCURRENCY IN A MULTI-SYSTEM SHARED DISK ENVIRONMENT

(75) Inventors: RamanaKumari M. Croisettier, Morgan Hill, CA (US); Jeffrey William Josten, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 10/439,686

(22) Filed: May 16, 2003

(65) Prior Publication Data

US 2004/0230621 A1    Nov. 18, 2004

(51) Int. Cl.[7] ............................................. G06F 12/00
(52) U.S. Cl. ...................... 711/147; 711/112; 711/150; 707/201
(58) Field of Search ..................... 711/112, 147, 150, 711/159; 707/8, 201

(56) References Cited

U.S. PATENT DOCUMENTS

| 5,151,988 | A | * | 9/1992 | Yamagishi | ..................... 707/8 |
| 5,761,660 | A | | 6/1998 | Josten et al. | ..................... 707/8 |
| 5,813,032 | A | | 9/1998 | Bhargava et al. | ........... 711/130 |
| 5,940,926 | A | * | 8/1999 | Inzinna et al. | ................. 15/301 |
| 6,163,783 | A | | 12/2000 | Hintz et al. | .................. 707/201 |
| 6,298,345 | B1 | * | 10/2001 | Armstrong et al. | ............ 707/8 |
| 6,321,235 | B1 | | 11/2001 | Bird | ............................. 707/203 |
| 6,421,682 | B1 | | 7/2002 | Craig et al. | ................. 707/103 |
| 6,804,672 | B1 | * | 10/2004 | Klein et al. | ..................... 707/8 |
| 2001/0051956 | A1 | | 12/2001 | Bird | ............................. 707/203 |
| 2002/0004887 | A1 | | 1/2002 | Kubo | ........................ 711/147 |
| 2002/0023070 | A1 | | 2/2002 | Branch et al. | .................. 707/1 |
| 2002/0095557 | A1 | | 7/2002 | Constable et al. | .......... 711/163 |
| 2002/0099559 | A1 | | 7/2002 | Liu et al. | ........................ 705/1 |
| 2002/0108023 | A1 | | 8/2002 | Constable et al. | .......... 711/163 |

FOREIGN PATENT DOCUMENTS

CA        2384259        4/2002

OTHER PUBLICATIONS

Wietrzyk, V.I.S.; Orgun, M. A.; "ADDROL: A Method for On-line Reorganization in a Multisystem DBMS with Shared Disks", 2000, Abstract: C2000-12-6160B-032.

Stuy et al.: "Using "Defunct" Cache Entries to Avoid Artificial Deadlocks When Caching Catalog Tables", RD n446 Jun. 2001 Article 446194.

(Continued)

*Primary Examiner*—B. James Peikari
*Assistant Examiner*—Woo H. Choi
(74) *Attorney, Agent, or Firm*—Sandra M. Parker, Esq.

(57) ABSTRACT

A system, computer usable medium and computer-based method for altering a sequence number assignment pattern while preserving integrity and high concurrency in an environment having a plurality of applications on at least one computer system sharing a direct access storage device (DASD). The method generates and assigns sequence numbers for a shared sequence object located on the shared DASD to a plurality of applications executing concurrently and using the shared sequence object. When an application starts altering the shared sequence object attribute(s) during concurrent assignment of sequence numbers by other applications, it notifies all computer systems using the shared sequence object to locally refresh the sequence object attribute descriptor and discard unused reserved sequence numbers, and then updates the altered shared sequence object attribute and last assigned sequence number on the shared DASD.

9 Claims, 9 Drawing Sheets

OTHER PUBLICATIONS

Bhargara G. et al.: Scheme for High data Availability from a Shared-Cache in the Event of Hardware/Software failures in a Multi-system Shared Disk Environment, TBD v37 n12 12-94 p. 251.

Mohan et al.:Efficient Locking and Caching of Data in the Multisystem Shared Disks Transaction Environment, Abstract C9301-6150N-003.

Mukai et al. "DBMS Protocol for Safe File Extension in a Multisystem Shared Disk Environment", Article 444198.

Bird, P. M.: "Management of Cached Dynamic SQL Integrity in a Multiple Node RDBMS", Article 416125.

Malkemus, T.R.: "Index Locking and Splitting", 1982, TDB 12-82 p. 3725-3729.

* cited by examiner

| DB2-A | DB2-B |
|---|---|
| Received the request for next sequence value when the SQD is in 'refreshed' state but with an indication whether a new cache is needed.<br><br>For generating the next value:<br><br>1. Get the catalog table row with a P-lock to read MaxAssignedVal.<br><br>2. If needed, allocate new cache and determine the value to be stored in MaxAssignedVal.<br><br>3. Write row back to the catalog table with the new MaxAssignedVal.<br><br>4. Return with next sequence value. | Received the ALTER request:<br><br>1. Get the catalog table row with a commit-duration X-lock (lock retained in case of member failure) on the catalog page that holds the row.<br><br>2. Read the attributes and make the necessary changes in local buffer.<br><br>3. Send notification via s/w to all other DB2 members to refresh local SQD for this sequence object because it is being ALTERed. |

FIG. 3A

| DB2-A | DB2-B |
|---|---|
| 5. Received notification from DB2-B. | Wait for response from all DB2 members. |
| 6. Read the catalog table row. | |
| 7. Only if MaxAssignedVal in row belongs to cache held here, update MaxAssignedVal, with a P-lock, with the actual last assigned value. | |
| 8. Mark the SQD as need-to-refresh in DB2-A. | |
| 9. Flush the cache and Return. | |
| 10. Received the request for next sequence value. | |

FIG. 3B

| DB2-A | DB2-B |
|---|---|
| 11. Notices that the SQD has been marked as needing a refresh. | When all DB2 members have responded: |
| 12. Refresh the SQD by reading the catalog table row with a manual-duration S-lock. This makes DB2-A to wait behind X- lock held by DB2-B until DB2-B updates shared catalog table and releases the X-lock at commit time. (If the X-lock is not released soon enough, timeout occurs.) If timeout does not happen, the page has been read after finished DB2-B's update. Mark the SQD as refreshed in DB2-A. | 4. Read catalog table row, retrieve MaxAssignedVal and write it in the row with the changed attribute "Increment by 2". If DB2-B was the one holding the last cache, then it is the DB2-B that would update the MaxAssignedVal to be the actual last assigned value.<br><br>5. Write the updated catalog table row back and end the ALTER process. |
| 13. Continue as usual, creating new cache values. | 6. Mark ALTERed SQD locally as need-to-refresh and flush the cache. |

FIG. 3C

METHOD AND SYSTEM FOR ALTERING A SEQUENCE NUMBER ASSIGNMENT PATTERN WHILE PRESERVING INTEGRITY AND HIGH CONCURRENCY IN A MULTI-SYSTEM SHARED DISK ENVIRONMENT

BACKGROUND OF THE INVENTION

1. Field of the Invention

This invention relates in general to database management systems performed by computers, and in particular to a method and system for altering a sequence number assignment pattern while preserving integrity and high concurrency in a multi-system shared disk environment.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

A typical relational database management system includes both database files and index files. The database files store data in the rows and columns of tables stored on data pages. A page is a physical unit of transfer between main storage and secondary storage. In such a table, the rows may correspond to individual records while the columns of the table represent attributes of the records. For example, in a customer information table of a database management system, each row might represent a different customer data object while each column represents different attributes of the customers, such as the name of a particular customer, the amount owed by the customer and the cash receipts received from the customer. The actions of a transaction that cause changes to recoverable data objects are recorded in a log.

Generally, many transaction processing systems, Data Base Management Systems and application programs have a need for enhanced transaction control for databases. Transaction control is well understood in the art and is often used to guarantee the integrity of enterprise databases. Guaranteeing the integrity of databases in the face of concurrent execution of multiple transactions and various failures, while avoiding serialization of different systems' operations, is a very important issue with enterprise databases. Indeed, many methods have been developed in the past to deal with these problems for enterprise databases. Specifically, one such method, utilized in many transaction processing systems, database management systems and applications includes an efficient technique for assigning, to concurrent transactions, unique sequence numbers which are recoverable and follow a predetermined sequence pattern. Such numbers may have a numeric data type such as small integer, positive and negative numbers with decimal precision 1 or 2, etc. In current database technology, transaction processing systems usually assign a unique sequence number (SN) to each one of numerous transactions, log file records, fields, etc. Generally, the SNs comprise values assigned a monotonically increasing value in an ascending sequence, although they can encompass other sequence patterns, as well.

One problem arises in such disk sharing multi-systems when the sequence number assignment to a transaction includes an update operation to a record which is locked until transaction commits. This serializes other transactions because they have to wait for the updated record to be unlocked in order to receive their sequence number assignment. In a transaction processing multi-system, where there is data sharing, an update of this record causes serialization across all systems, which inhibits transaction throughput. This problem can be avoided with selective locking and delayed record update on the shared disk.

However, a presently unsolvable major problem arises in a data management multi-system with shared data when a system of the enterprise is allowed to alter a sequence number assignment pattern while the sequence numbers are being assigned to other systems. One solution would be to perform the sequence number generation off-line whilst the change in the sequence number assignment pattern is being done. However, this is disruptive to applications and users.

Therefore, there is a need for a simple, optimized and generic method and system allowing alteration of a sequence number assignment pattern while preserving integrity of assigned sequence numbers and high concurrency in a multi-system shared disk environment.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based method for altering a sequence number assignment pattern while preserving integrity and high concurrency in an environment having a plurality of applications on computer systems sharing a direct access storage device (DASD). The method generates and assigns sequence numbers for a shared sequence object located on the shared DASD to applications executing concurrently and using the shared sequence object. When an application starts altering the shared sequence object attribute(s) during concurrent assignment of sequence numbers by other computer systems, it notifies all computer systems using the shared sequence object to locally refresh the sequence object attribute descriptor and discard unused reserved sequence numbers, and then updates the altered shared sequence object attribute descriptor and preserves a last assigned sequence number on the shared DASD. The shared sequence objects' attributes are located in a shared catalog table located on the shared DASD. The shared catalog table has a space for each shared sequence object's attributes and a pointer storing a last reserved sequence number for the sequence object. The pointer is reset to a last assigned sequence number, during altering of a shared sequence object attribute, to allow discarding of unused reserved sequence numbers.

Another preferred embodiment of the present invention is a system implementing the above-mentioned method embodiment of the present invention.

Yet another preferred embodiment of the present invention includes a computer usable medium tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout:

FIGS. 3A, 3B and 3C illustrate an exemplary pseudocode showing processing of different request commands in two clients, according to the preferred embodiments of the present invention;

DETAILED DESCRIPTION OF THE PREFERRED EMBODIMENTS

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, a method and a computer usable medium embodying a program of instructions executable by a computer to perform the method of the present invention for altering a sequence number assignment pattern while preserving integrity of sequence numbers and high concurrency in a multi-system shared disk environment.

The preferred embodiments of the present invention utilize a shared sequence object for generation of a sequence of numbers with shared properties, such as monotonically increasing or decreasing sequence numbers. These recoverable, unique sequence numbers are created for a client application, one by one, and being assigned by request to multiple applications or transactions executing concurrently on the same or different computer systems of the environment. This assignment of sequence numbers is accomplished without waiting for these other applications or transactions to commit, while being assigned sequence numbers, and thus with minimal path length and wait. Furthermore, the present invention is directed to preserving the integrity of a shared sequence object in a multi-system shared-disk environment, when one or more attributes of the shared sequence object are being altered by one application while sequence numbers are being generated for the same shared sequence object at the request of other applications sharing its use.

Figure 1:
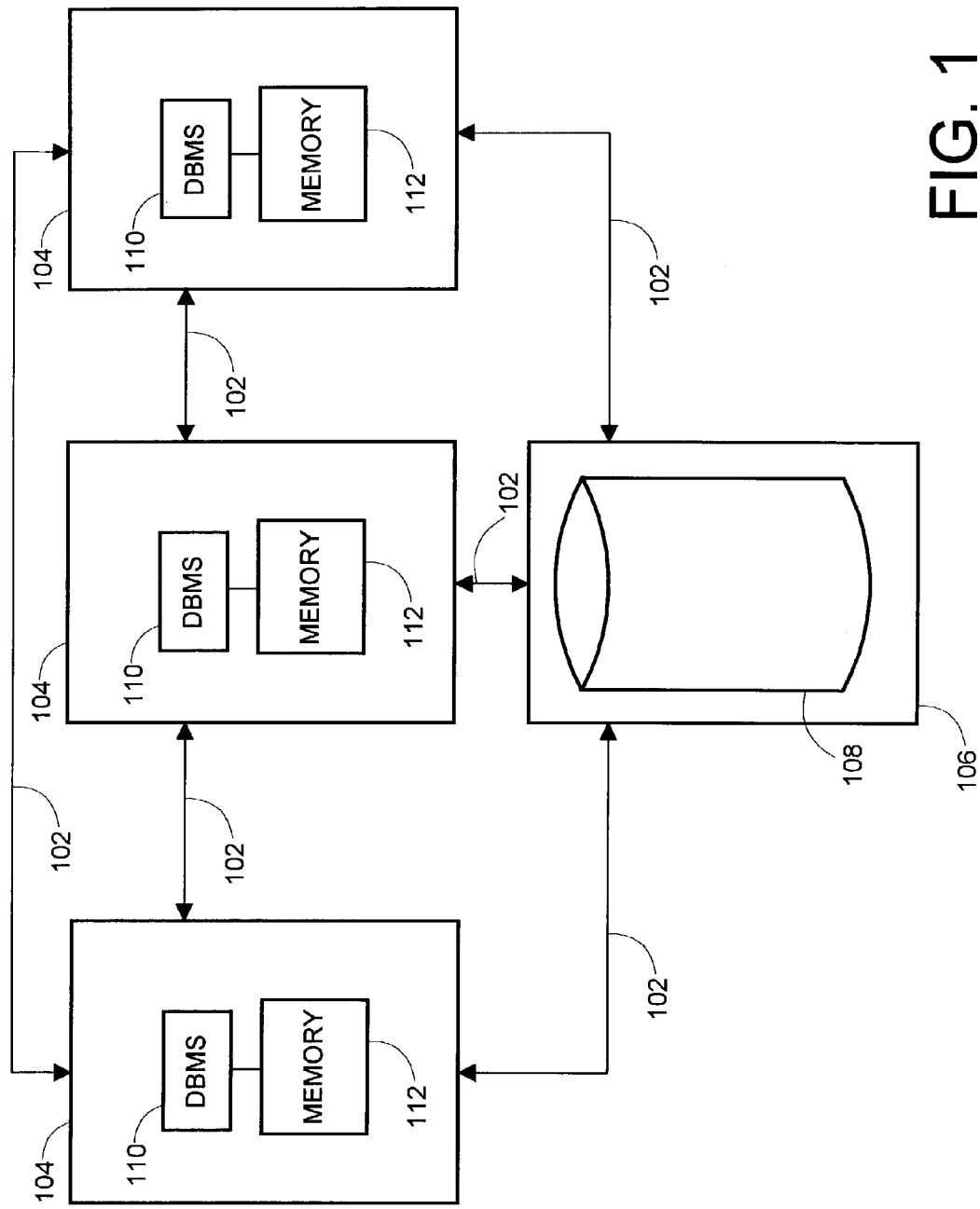
FIG. 1 schematically illustrates an exemplary computer hardware and software environment usable by the preferred embodiments of the present invention.

FIG. 1 schematically illustrates an exemplary computer hardware and software environment usable by the preferred embodiments of the present invention. A typical multi-system environment includes multiple computer systems and uses a network 102 to connect these independently-operated computer systems (clients) 104 to at least one shared-disk server 106 having one or more shared direct access storage devices (DASDs) 108 with shared databases. Each client 104 has a DBMS 110, providing access to databases stored on the DASD 108, and a memory 112 containing a cache structure (buffer pool), used for retaining copies of recently accessed pages. Each client 104 runs application programs and has a conventional processor executing instructions stored in an associated computer memory and a computer system terminal and other conventional features, well known in the art and thus not shown in FIG. 1. It may or may not include a Transaction Processing System, not shown, to which this application is also applicable. The network 102 may include LANs, WANs, SNA networks, Internet and the like and is used for data and message transmission. Data transmission may be performed between the shared-disk server 106 and each of the clients 104, and between the clients 104, through network 102 signal lines arranged therebetween. A typical combination of resources may include clients 104 that are implemented on personal computers or workstations, and servers 106 that are implemented on personal computers, workstations, minicomputers, or mainframes.

Each DASD 108 stores one or more relational databases. DASDs 108 may include optical disk drives, magnetic tapes and/or semiconductor memory. Each storage device permits receipt of a computer usable medium, such as a magnetic media diskette, magnetic tape, optical disk, semiconductor memory and other machine-readable storage device, and allows for program instructions and data, recorded on the computer usable medium, to be read and transferred into the computer memory. The recorded program instructions may include the code for the method embodiment of the present invention. Alternatively, the program steps can be received into the operating memory from a computer over the network.

Operators of the client computer system 104 terminal use a standard operator terminal interface, not shown, to transmit electrical signals to and from the client computer system 104, that represent commands for performing various tasks, such as search and retrieval functions, named queries. Data storage and retrieval is accomplished with queries against a database stored on the shared electronic storage device DASD 108. In the present invention, these queries conform to the Structured Query Language (SQL) standard, and invoke functions performed by a DataBase Management System (DBMS) 110, such as a Relational DataBase Management System (RDBMS) software, located in each client 104. In the preferred embodiments of the present invention, the RDBMS software is the Version 8 of the DB2 product, offered by IBM for the z/OS, AS400, OS390, or OS/2 operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries and to non-relational databases. The method and system of the present invention may be used in a localized or distributed computing environment in which two or more computer systems are connected by a network, such as World Wide Web, including environments in which the networked computers are of different type.

Of course, those skilled in the art will recognize that many modifications may be made to this configuration without departing from the scope of the present invention. In addition, those skilled in the art will recognize that any combination of the above components, or any number of different components, including different computers, computer programs, peripherals, and other devices, may be used to implement the present invention, so long as similar functions are performed thereby.

Figure 2:
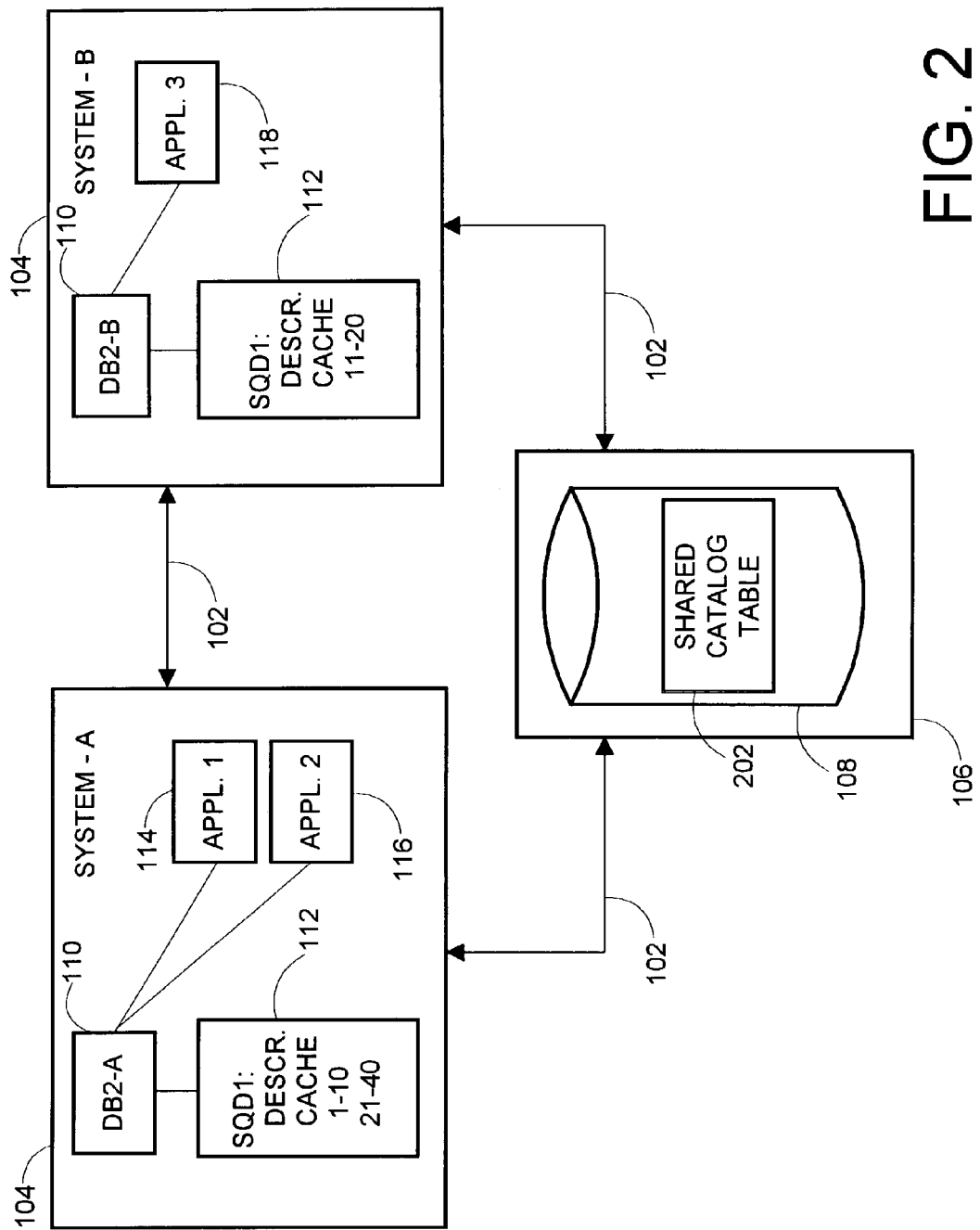
FIG. 2 schematically illustrates in more detail an exemplary computer hardware and software environment, according to the preferred embodiments of the present invention.

FIG. 2 illustrates in more detail an exemplary environment enabling preferred embodiments of the present invention. In the system shown in FIG. 2 there are two client computer systems 104 and the shared server 106 which further includes a database module named shared catalog table, described below.

DB2 Version 8 introduced the ability to use an ALTER command to alter sequence attributes of a shared sequence object which generates sequence numbers. In a multi-system shared-disk environment of FIG. 1 concurrency is of utmost importance, and the integrity of the shared sequence object has to be preserved when the sequence attributes of a shared sequence object are being altered by one system while sequence numbers are being generated for the same shared sequence object by the other applications sharing it.

In a multi-system of FIGS. 1 and 2 this is accomplished with a shared catalog table 202. Catalogs are data sets typically used to categorize other data sets. Some catalogs are shared, allowing clients to locate data sets by name, without knowing their location, thus allowing data to be moved without change in application program instructions. This creates a powerful multi-system which can support multiple users simultaneously. Local system cache in memory 112, located in each client's 104 memory, usually contains recently accessed catalog records. In conventional systems allocation of each client-requested sequence number includes writing a catalog modification to the DASD 108, which requires significant overhead in terms of the cross-system communication and lengthy I/O activity due to locking of the DASD 108 disk from other client 104 systems.

In the preferred embodiments of the present invention the shared server 106 of FIG. 2 includes the shared catalog table 202 which contains information about the attributes of each shared sequence object, wherein the local descriptors for each such sequence object are stored in memory 112. The shared catalog table 202 is preferably located on the DASD 108. Each client 104 allocates its own local cache of sequence values in memory 112, stored in its local memory and used when caching is in effect. Among other data and cache, the memory 112 stores a plurality of data structure subsets, one for each sequence object, indicated with sequence object descriptors (SQDs). Each such local data structure contains information about one shared sequence object, such as its properties and their current values, obtained from that client's 104 point of view. This local data structure SQD becomes created at the first moment when an application 114, 116 or 118 on that client 104 has to generate a value for that shared sequence object, and it gets initialized with all relevant information about this shared sequence object obtained from its template row from the shared catalog table 202 located on the shared server 106. Each local SQD has an indicator showing whether the shared sequence object is in a valid (refreshed) state or not.

The shared catalog table 202 has one row for each sequence object defined in each client DBMS member that uses that catalog table 202. The columns of this row contain data for the sequence attributes. The shared catalog table 202 maintains for each shared sequence object the last value from the cache of the client 104 which modified the shared catalog table 202 last. This value is stored in the shared catalog table 202, in the row associated with the sequence object, in a pointer field named MaxAssignedVal and represents the last logical value allocated/reserved by the last active cache for the sequence object, which may not have actually been assigned yet as a sequence number. The MaxAssignedVal field has an indicator showing whether any value has been generated for the sequence object yet. The MaxAssignedVal field gets updated every time a cache of one of the clients 104 is allocated and it represents the last value reserved by that cache. Because all applications on clients 104 share the shared catalog table 202 and may cause an update of the MaxAssignedVal field, in this data sharing environment of the present invention the access to this field is serialized via a physical system-level lock named page-cache lock (P-Lock). P-lock is above and outside of the scope of the local transaction locks (L-Locks) used by other clients 104, and, when in use, prevents them from concurrent updating of the shared catalog table 202, thus preserving shared-disk coherency.

FIG. 2 and FIGS. 3A, 3B and 3C allow us to explain in detail how the preferred embodiments of present invention solve the problem of maintaining the integrity of a shared sequence object in the multi-system computer environment of FIG. 1. In FIG. 2 one client 104 is named System-A, having its own cache in memory 112 and a Data Base Management System named DB2-A 110. Other client 104 is named System-B, having its cache in memory 112 and a Data Base Management System named DB2-B 110. The applications on clients 104 are members of a data sharing environment which use a plurality of shared disks DASD 108 on the shared server 106, managed by the local Data Base Management Systems DB2-A and DB2-B 110.

To more fully understand the operation of the present invention an exemplary shared sequence object, defined with SQD1, is shared by multiple applications of System-A and System-B 104 and is defined by the following properties (attributes): "Cache 10 values", "Start with the minimum value for the data type", "Increment by 1", "MaxValue" corresponding to that data type and "Repeat the Cycle" (CYCLE=yes). Since the applications on the System-A and System-B are concurrently using the shared sequence object from SQD1, there will be a cache created in each System-A and System-B. These two caches are in use simultaneously. At the beginning, System-A starts with cache values 1 to 10 reserved for DB2-A and then System-B gets cache values 11 to 20 reserved for DB2-B.

The problem in conventional systems occurs when one client 104 application changes the shared sequence object attributes by an ALTER command presented to its DBMS, in which case that client 104 should notify all other clients of the multi-system environment, which use the same shared sequence object, of the change. Let us assume that DB2-A has already assigned values 1 to 10 to the applications on client System-A. Next, an application of the System-B, with the privilege to alter the attributes of the shared sequence object, requests substitution of the attribute "Increment by 1" with "Increment by 2", just when System-A was in the process of allocating a new cache of values 21 to 30 for DB2-A. DB2-B of the System-B has retrieved the shared catalog table 202 row for the to-be-ALTER-ed shared sequence object. While the DB2-B is locally updating the row with the change in the Increment attribute, DB2-A allocates a new cache of values 21 to 30 and updates the corresponding (SQD1's) MaxAssignedVal with a P-lock unbeknownst to DB2-B. Unaware, the DB2-B sets the attribute to "Increment by 2" and writes back the shared catalog table 202 sequence object row with the old MaxAssignedVal field value.

Without the present invention one solution for this problem may be for DB2-B to simply check if the sequence object row possibly changed under a P-lock while it was preparing the update, before writing the shared catalog table 202 row back. However, this is inefficient because while DB2-B has checked this and has taken the necessary action and is ready to write the sequence object row, it again has to check for the same thing. This could happen repeatedly when multiple applications on multiple clients simultaneously generate values for the same shared sequence object. Moreover, the use of the P-lock as well as other safety mechanisms cannot be avoided in such situation, in a multi-system environment of the present invention, because it is essential for the high concurrency and integrity aspect of the shared sequence objects.

The notification problem is being solved by the preferred embodiments of the present invention as shown in FIGS. 3A, 3B and 3C. FIGS. 3A, 3B and 3C illustrate an exemplary pseudocode showing processing of different request commands in two clients, according to the preferred embodiments of the present invention. They illustrate the above-mentioned example which arises from the concurrent use of an ALTER attribute of a sequence object on DB2-B and sequence number value generation for the same sequence object, shared by DB2-A.

As shown in FIGS. 3A, 3B and 3C, DB2-A receives from a System-A application a request for a next sequence value when the DB2-A's SQD for a shared sequence object shows that it is in the 'refreshed' state, with an indication whether a new cache is needed. For generating the next sequence number value, it has to be determined what was the last value of the last active cache. Thus, DB2-A gets the shared catalog table row for this sequence object with a physical P-lock, in order to read its MaxAssignedVal, which now shows 20. At that time DB2-B receives from an application in System-B a request to ALTER the "Increment by 1" attribute and substitute it with "Increment by 2" attribute.

DB2-A allocates new cache values 21–30, because there was an indication that it was needed, and determines the value to be stored for that sequence object's MaxAssignedVal, which is now 30. It writes the sequence object row back to the shared catalog table 202 with the new MaxAssignedVal. It returns to the System-A application the next sequence value, which is now 21. During this time, DB2-B has already retrieved the catalog table row for the sequence object, which still has the old MaxAssignedVal value, with a commit-duration exclusive logical lock, such as an X-lock, which is a lock retained in case of member failure. It reads the attributes and makes the necessary changes in the System-B local buffer, according to the ALTER specification. Next, System-B sends a notification, via its system I/O routines and over network 102, to all other clients 104 of the multi-system environment which share the same sequence object. This message notifies them to invalidate their local SQD for the sequence object and refresh their information for this shared sequence object because it is being ALTER-ed. DB2-B waits for response from all DB2 members before updating the catalog table row for this sequence object.

When DB2-A receives the notification from DB2-B, it reads the shared catalog table 202 row corresponding to this sequence object's MaxAssignedVal with a physical P-lock. Only if this value, as read, corresponds to System-A cache, DB2-A takes action and updates the MaxAssignedVal, with a P-lock, with the last sequence value assigned from the local cache on System-A, which was 21. Next, it marks this SQD in the DB2A as needs-to-refresh, it flushes the cache of previously-allocated values and returns. It will refresh that SQD when it receives the new request for a next sequence value.

When all DB2 members have responded, DB2-B reads the shared catalog table sequence object row and retrieves the MaxAssignedVal, which is now 21, and writes it in a local copy of the sequence object row holding the new sequence object attributes with the Increment attribute changed to "Increment by 2". If DB2-B was the client DBMS holding the last cache, then this DBMS updates MaxAssignedVal to be the actual last assigned value. Next, it writes the updated sequence object row back to the shared catalog table 202. It marks the altered SQD locally as needs-to-refresh and flushes the cache and then returns. Later, a commit to release the X-lock is performed. When DB2-A receives the new request for a next sequence value it notices the there was a needs-to-refresh request and refreshes the SQD by reading the shared catalog row with a manual-duration shared S-lock. If DB2-B has not yet committed its ALER operation, the S-lock will make DB2-A wait behind the physical X-lock held by DB2-B, until DB2-B updates the sequence object row with sequence attributes in the shared catalog table and releases the X-lock at commit time. If the X-lock is not released soon enough, a timeout occurs. If the timeout does not happen, the row has been read by DB2-A after DB2-B finished its update of the shared catalog table row. Next, DB2-A marks the SQD as refreshed and continues as usual, by creating new cache values, which are now incremented by 2, and are 23, 25, etc.

The method and system of the present invention can handle all situations that arise from the concurrent use of an ALTER attribute on one client and sequence number value generation for a sequence object shared by that client and other clients of the multi-system environment of FIG. 1. Flowcharts representing method preferred embodiments of the present invention are shown in FIG. 4, FIG. 5, FIG. 6 and FIG. 7.

Figure 4:
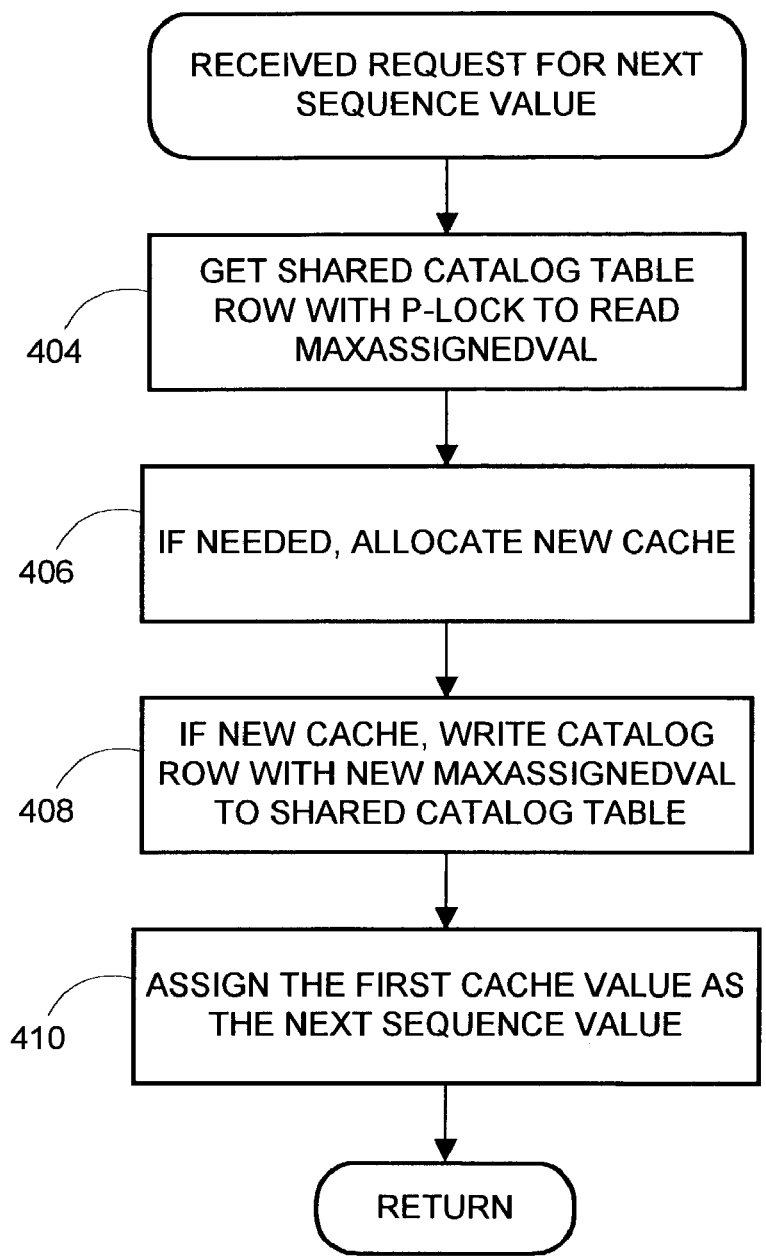
FIG. 4 illustrates a flowchart of a procedure performed to honor requests for a next sequence value, according to the preferred embodiments of the present invention.

FIG. 4 illustrates a flowchart of a procedure performed to honor requests for a next sequence value. This procedure is followed when a client DBMS receives a request from its local application for a next sequence number from the cache for a shared sequence object. In step 404 the DBMS gets shared catalog table row containing attributes for this sequence object with a P-lock. It reads the MaxAssignedVal column value. If needed, a new cache is allocated in step 406. Then, in step 408 the sequence object row is updated with the new value for MaxAssignedVal and written back to the shared catalog table 202. Next sequence value is assigned the first new cache value, in step 410, and returned to the application.

Figure 5:
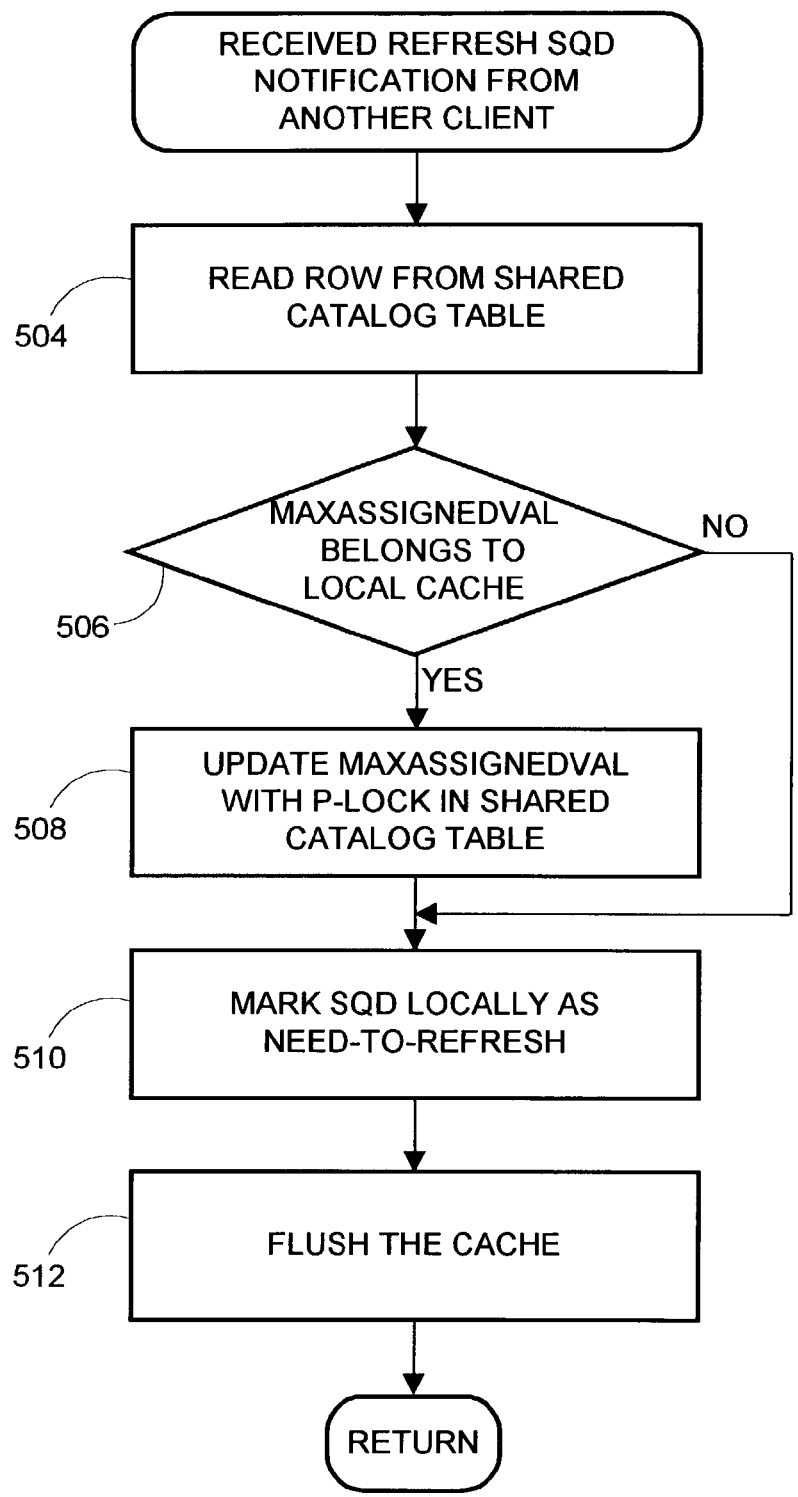
FIG. 5 illustrates a flowchart of a procedure performed to honor a notification for refresh, received from another client according to the preferred embodiments of the present invention.

FIG. 5 illustrates a flowchart of a procedure followed when a client DBMS receives a notification from another client that a shared sequence object SQD should be refreshed because it is being ALTER-ed. In step 504 the DBMS reads the sequence object row from the shared catalog table 202. In step 506 it checks whether the MaxAssignedVal belongs to the local cache in this client system. If so, it continues and in step 508 it updates the MaxAssignedVal in the shared catalog table 202 with a P-lock. In step 510 it locally marks the SQD as needs-to-refresh in order to invalidate it. It flushes the cache in step 512 and returns.

Figure 6:
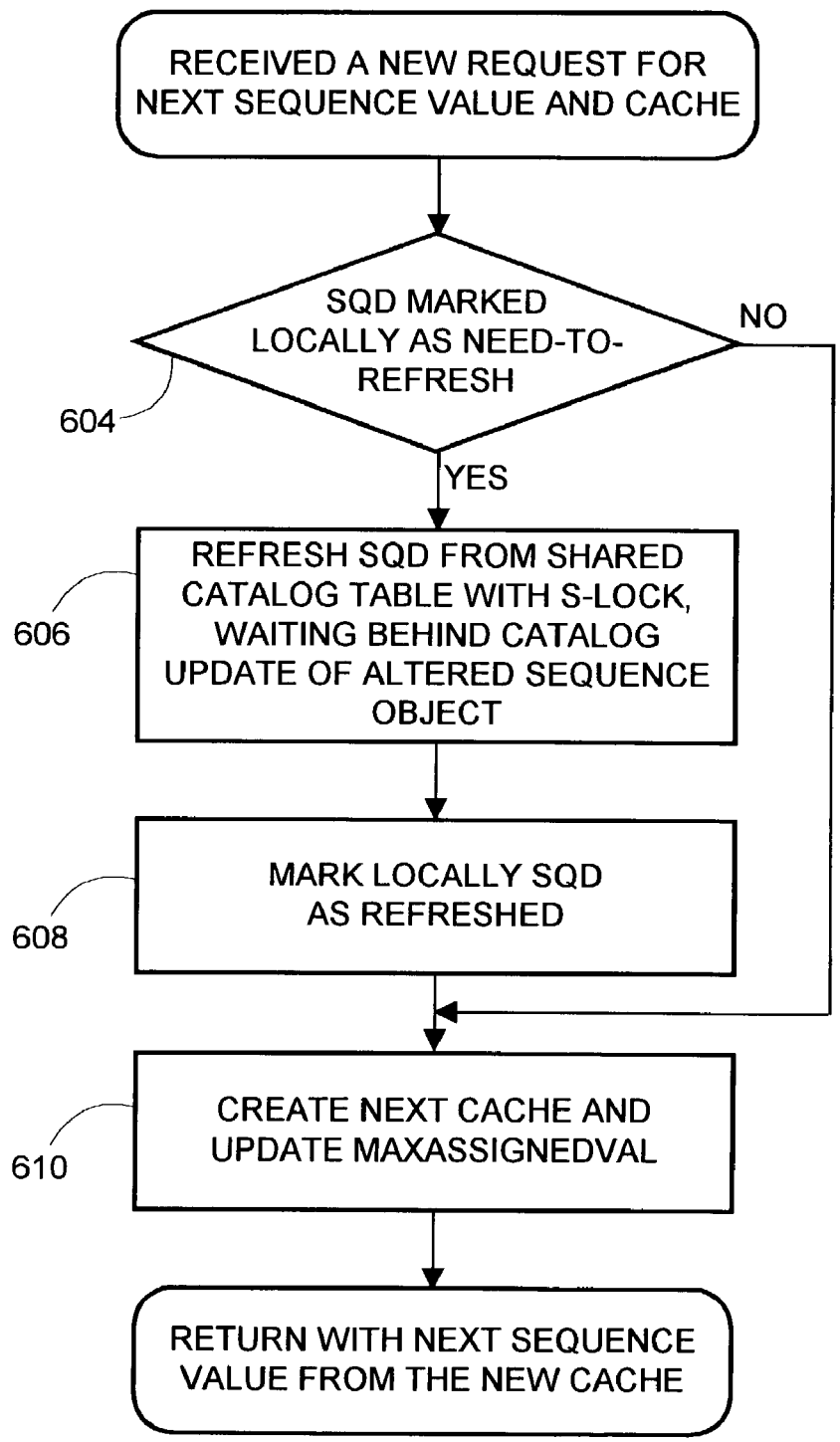
FIG. 6 illustrates a flowchart of a procedure performed to honor request for a next cache value, according to the preferred embodiments of the present invention.

FIG. 6 illustrates a flowchart of a procedure followed when a client DBMS receives a new request from its local application for the next value for a shared sequence object, requiring a new cache. In step 604 it checks whether the SQD was previously marked as needs-to-refresh. If so, in step 606 SQD is refreshed from the shared catalog table 202 with an S-lock, waiting behind catalog table update of the altered sequence object, by same or another client, for ALTER-ing the shared sequence object on the DASD 108. When the catalog table row is successfully read, in step 608 it locally marks the SQD as refreshed. A new cache of the next n values is created and MaxAssignedVal is updated in step 610 and the next sequence value from the new cache is returned.

Figure 7:
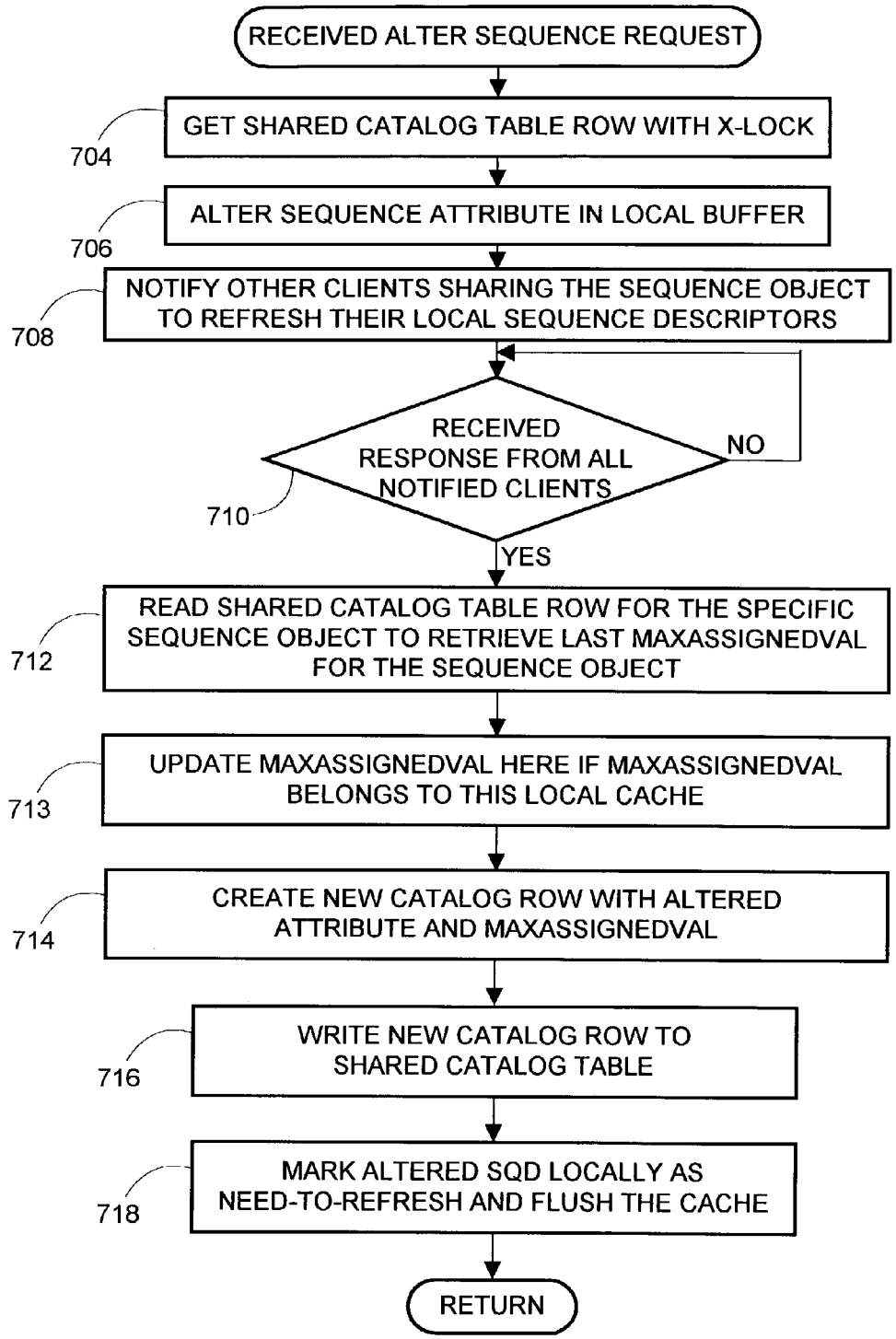
FIG. 7 illustrates a flowchart of a procedure followed when a client receives a request from its local application to ALTER a shared sequence object attribute, according to the preferred embodiments of the present invention.

FIG. 7 illustrates a flowchart of a procedure followed when a client DBMS receives a request from its local application to ALTER attributes of a shared sequence object. In step 704 it gets the shared catalog table 202 row for this shared sequence object with an X-lock. It then alters the sequence attribute in the sequence object row in local buffer of memory 112, in step 706. In step 708 it notifies all other clients which are sharing this sequence object to refresh their local SQDs. It then waits and when responses have been received from all notified clients in step 710, it reads the corresponding shared catalog table 202 sequence object row, in step 712, to retrieve the last MaxAssignedVal for this sequence object. If the MaxAssignedVal belongs to the local cache, it is updated in step 713. In step 714 it creates a sequence object row with this MaxAssignedVal and altered attribute and writes this row to the shared catalog table 202 in step 716. In step 718 it marks the altered SQD locally as needs-to-refresh and flushes the cache and then returns. It releases the X-lock at commit time.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method for altering a sequence number assignment pattern while preserving integrity and high concurrency in an environment having at least one computer system with a plurality of applications sharing a direct access storage device (DASD), the method comprising the steps of:
   (a) generating and assigning sequence numbers for a shared sequence object located on the shared DASD to a plurality of applications executing concurrently and using the shared sequence object; and
   (b) when a computer system application starts altering a sequence number assignment pattern by changing at least one attribute of the shared sequence object during concurrent assignment of sequence numbers to other applications:
      (i) notifying the computer systems using the shared sequence object to locally refresh a descriptor of the sequence object attribute and discard unused reserved sequence numbers; and
      (ii) on the shared DASD, updating the altered shared sequence object attribute and preserving a last assigned sequence number.

2. The method according to claim 1, wherein the shared sequence object attributes being located in a shared catalog table located on the shared DASD.

3. The method according to claim 2, wherein the shared catalog table comprising a space for each shared sequence object attribute's description and a pointer storing a last reserved sequence number for the sequence object, wherein the pointer being reset to a last assigned sequence number, during altering of a shared sequence object attribute, to allow discarding of unused reserved sequence numbers.

4. A data processing system for altering a sequence number assignment pattern while preserving integrity and high concurrency, comprising:
   a direct access storage device (DASD);
   a plurality of application running on at least one computer system sharing the DASD;
   means for generating and assigning sequence numbers for a shared sequence object located on the shared DASD to a plurality of applications executing concurrently and using the shared sequence object;
   means for altering a sequence number assignment pattern by changing at least one attribute of the shared sequence object by a computer system application during concurrent assignment of sequence numbers to other applications;
   means for notifying the computer systems using the shared sequence object to locally refresh a descriptor of the sequence object attribute and discard unused reserved sequence numbers; and
   means for updating, on the shared DASD, the altered shared sequence object attribute and preserving a last assigned sequence number.

5. The system according to claim 4, wherein the shared sequence object attributes being located in a shared catalog table located on the shared DASD.

6. The system according to claim 5, wherein the shared catalog table comprising a space for each shared sequence object attribute's description and a pointer storing a last reserved sequence number for the sequence object, wherein the pointer being reset to a last assigned sequence number, during altering of a shared sequence object attribute, to allow discarding of unused reserved sequence numbers.

7. A computer usable medium, in a database management system, tangibly embodying a program of instructions executable by a computer to perform a computer-based method for altering a sequence number assignment pattern while preserving integrity and high concurrency in an environment having at least one computer system with a plurality of applications sharing a direct access storage device (DASD), the method comprising the steps of:
   (a) generating and assigning sequence numbers for a shared sequence object located on the shared DASD to a plurality of applications executing concurrently and using the shared sequence object; and
   (b) when a computer system application starts altering a sequence number assignment pattern by changing at least one attribute of the shared sequence object during concurrent assignment of sequence numbers to other applications:
      (i) notifying the computer systems using the shared sequence object to locally refresh a descriptor of the sequence object attribute and discard unused reserved sequence numbers; and
      (ii) on the shared DASD, updating the altered shared sequence object attribute and preserving a last assigned sequence number.

8. The method according to claim 7, wherein the shared sequence object attributes being located in a shared catalog table located on the shared DASD.

9. The method according to claim 8, wherein the shared catalog table comprising a space for each shared sequence object attribute's description and a pointer storing a last reserved sequence number for the sequence object, wherein the pointer being reset to a last assigned sequence number, during altering of a shared sequence object attribute, to allow discarding of unused reserved sequence numbers.

* * * * *